(12) United States Patent
Gharavi-Alkhansari et al.

(10) Patent No.: US 8,634,668 B2
(45) Date of Patent: Jan. 21, 2014

(54) METHOD OF COMPRESSION OF DIGITAL IMAGES USING A FIXED NUMBER OF BITS PER BLOCK

(75) Inventors: Mohammad Gharavi-Alkhansari, Santa Clara, CA (US); Ali Tabatabai, Cupertino, CA (US); Yoichi Yagasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 154 days.

(21) Appl. No.: 13/035,060

(22) Filed: Feb. 25, 2011

(65) Prior Publication Data

US 2012/0219231 A1 Aug. 30, 2012

(51) Int. Cl.
*G06K 9/36* (2006.01)
*G06K 9/46* (2006.01)

(52) U.S. Cl.
USPC .......................................... 382/238

(58) Field of Classification Search
USPC .................. 382/232, 238, 239, 246, 248, 251
See application file for complete search history.

(56) References Cited

U.S. PATENT DOCUMENTS

| | | | |
|---|---|---|---|
| 5,301,032 A | 4/1994 | Hong et al. | |
| 5,323,187 A | 6/1994 | Park | |
| 6,272,180 B1 | 8/2001 | Lei | |
| 6,356,588 B1 * | 3/2002 | Otto | 375/240.03 |
| 6,570,510 B2 | 5/2003 | Chen et al. | |
| 2002/0061063 A1 | 5/2002 | Otto | |
| 2004/0202375 A1 | 10/2004 | Kalevo | |

FOREIGN PATENT DOCUMENTS

| | | |
|---|---|---|
| EP | 1100049 A2 | 5/2001 |
| RU | 2342804 C2 | 12/2008 |
| RU | 2009110512 A | 9/2010 |
| WO | 2009052206 A1 | 4/2009 |

OTHER PUBLICATIONS

Zhang et al., "A Hybrid Codec for Very Low Bit Rate Video Coding", IEEE 1996, Department of Electronic and Electrical Engineering, pp. 641-644.
H. Yuen et al., "Efficient Variable Rate Vector Quantization Using Quadtree Segmentation", IEEE Transactions on Consumer Electronics, vol. 42, No. 2, May 1, 1996, pp. 212-215.

* cited by examiner

*Primary Examiner* — Phuoc Tran
(74) *Attorney, Agent, or Firm* — Haverstock & Owens LLP

(57) ABSTRACT

A method of compression of digital images using a fixed number of bits per block is described. Intra-coding is used for lossless compression of digital images. The image is partitioned into blocks with the same size. The encoder generates a fixed and predetermined number of bits for each block. The encoding process includes gamma conversion applied to the input image to generate data. Additional stages include prediction, quantization, DPCM, entropy coding and refinement.

20 Claims, 16 Drawing Sheets

| Input: quantized residual | Binary representation of input | | Output |
|---|---|---|---|
| | magnitude | sign bit | |
| 0 | 0 | 1 | 1 |
| -1 | 1 | 0 | 010 |
| 1 | 1 | 1 | 011 |
| -2 | 10 | 0 | 00100 |
| 2 | 10 | 1 | 00101 |
| -3 | 11 | 0 | 00110 |
| 3 | 11 | 1 | 00111 |
| -4 | 100 | 0 | 0001000 |
| 4 | 100 | 1 | 0001001 |
| -5 | 101 | 0 | 0001010 |
| 5 | 101 | 1 | 0001011 |
| -6 | 110 | 0 | 0001100 |
| 6 | 110 | 1 | 0001101 |
| -7 | 111 | 0 | 0001110 |
| 7 | 111 | 1 | 0001111 |
| 8 | 1000 | 0 | 000010000 |
| ⋮ | ⋮ | ⋮ | ⋮ |

The magnitude bits

The sign bits

Fig. 3

METHOD OF COMPRESSION OF DIGITAL IMAGES USING A FIXED NUMBER OF BITS PER BLOCK

FIELD OF THE INVENTION

The present invention relates to the field of image processing. More specifically, the present invention relates to image compression using a fixed number of bits per block.

BACKGROUND OF THE INVENTION

Conventional image compression systems suffer from a number of problems. They are unable to exploit visual masking and other properties of the Human Visual System (HVS) which vary spatially with image content. One reason is that the quantization parameters used by these algorithms are, typically, relatively constant over the extent of the image. As a result, images are unable to be compressed efficiently. Also, to achieve a target bit-rate or visual quality using this method, the image must be compressed multiple times.

SUMMARY OF THE INVENTION

A method of compression of digital images using a fixed number of bits per block is described. Intra-coding is used for compression of digital images. The image is partitioned into blocks with the same size. The encoder generates a fixed and predetermined number of bits for each block. The encoding process includes gamma conversion applied to the input image to generate data. Additional stages include prediction, quantization, DPCM, entropy coding and refinement.

In one aspect, a method of image compression programmed in a controller in a device comprises partitioning an image into one or more blocks and encoding the one or more blocks, wherein a number of bits in each of the one or more blocks is fixed. The method further comprises applying gamma conversion to generate 10-bit data. The method further comprises computing prediction values for each pixel in a current block of the one or more blocks using one or more prediction modes. The prediction modes include at least one of generic, DC, right up, right up up, up, left up up, left up, left left up and left. The method further comprises applying quantization. The method further comprises computing Differential Pulse Code Modulation to generate residuals of the quantized values. The method further comprises implementing entropy coding to generate a variable length code for each residual of the quantized value. Implementing entropy coding is separated into two parts: code value/length computation and bitstream generation but with a single refinement stage and a single bitstream generation. The method further comprises implementing refinement. Implementing refinement includes a separate refinement stage for each quantization. Implementing refinement includes a single refinement stage. The method further comprises computing Pulse Code Modulation including shifting each pixel value a fixed number of bits. The method further comprises generating a bitstream. Generating the bitstream includes selecting a coding method of Differential Pulse Code Modulation or Pulse Code Modulation. The controller is selected from the group consisting of a programmed computer readable medium and an application-specific circuit. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television and a home entertainment system.

In another aspect, a system for image compression programmed in a controller in a device comprises a partitioning module for partitioning an image into one or more blocks and an encoding module for encoding the one or more blocks, wherein a number of bits in each of the one or more blocks is fixed. The system comprises a computing module for computing prediction values for each pixel in a current block of the one or more blocks using one or more prediction modes. The prediction modes include at least one of generic, DC, right up, right up up, up, left up up, left up, left left up and left.

In another aspect, a system for image compression programmed in a controller in a device comprises gamma module for applying gamma conversion to generate 10-bit data, a prediction module for computing prediction values for each pixel in a current block of the one or more blocks using one or more prediction modes, a quantization module for applying quantization, a DPCM module for computing Differential Pulse Code Modulation to generate residuals of the quantized values, a refinement module for implementing refinement, a PCM module for computing Pulse Code Modulation including shifting each pixel value a fixed number of bits and a bitstream module for generating a bitstream wherein generating the bitstream includes selecting a coding method of Differential Pulse Code Modulation or Pulse Code Modulation. The prediction modes include at least one of generic, DC, right up, right up up, up, left up up, left up, left left up and left. The controller is selected from the group consisting of a programmed computer readable medium and an application-specific circuit. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television and a home entertainment system.

In yet another aspect, a camera device comprises a video acquisition component for acquiring a video, a memory for storing an application, the application for partitioning an image into one or more blocks and encoding the one or more blocks, wherein a number of bits in each of the one or more blocks is fixed and a processing component coupled to the memory, the processing component configured for processing the application. The application is further for computing prediction values for each pixel in a current block of the one or more blocks using one or more prediction modes. The prediction modes include at least one of generic, DC, right up, right up up, up, left up up, left up, left left up and left.

BRIEF DESCRIPTION OF THE DRAWINGS

FIG. 3 illustrates an exemplary entropy coding table according to some embodiments.

DETAILED DESCRIPTION OF THE PREFERRED EMBODIMENT

Figure 1:
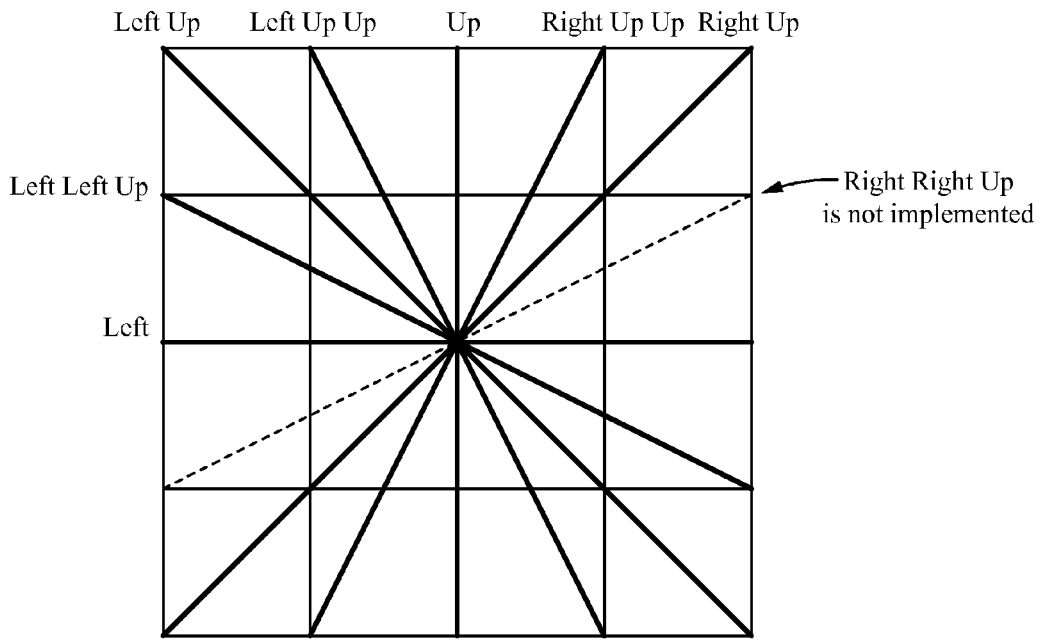
FIG. 1 illustrates seven possible prediction modes associated with different possible directions in an image according to some embodiments.

A method of intra-coding digital images is described herein. For intra-coding, the image is partitioned into vertical stripes. Each line of each vertical stripe is partitioned into small line segments referred to as blocks. Each stripe is decodable without the need for information about any other stripes. In some embodiments, the blocks all have the same size. An encoder generates a fixed and predetermined number of bits for each block. If implemented in hardware, the codec has very low complexity in terms of the number of gates needed for implementation. The codec is able to provide visually lossless compression for certain bit rates and for certain applications.

In some embodiments, a first stage of the encoding process is gamma conversion. For example, the codec uses a 10-bit gamma conversion. The gamma conversion is applied to the input image pixels to generate 10-bit data. The output of the gamma conversion is referred to as the "original pixel values." The value 10 is an example, and other values are possible as well.

In some embodiments, aspects of the encoding and/or decoding are described in further detail in U.S. patent application Ser. No. 12/789,091, filed May 27, 2010, titled, "AN IMAGE COMPRESSION METHOD WITH RANDOM ACCESS CAPABILITY," which is hereby incorporated by reference in its entirety.

Differential Pulse Code Modulation (DPCM)-Based Method and Prediction

In some embodiments, the encoder applies prediction, followed by quantization, followed by pixel-wise DPCM, followed by entropy coding and then refinement. The encoder first computes 'prediction' values for all of the pixels in the current block. Any prediction method is possible, for example, using the reconstructed value for the closest same color pixel to the left of the current pixel. In some embodiments, several (e.g. 9) prediction methods (or modes) are used in the codec. Each prediction mode has a name and number assigned. In an example, the nine prediction modes are generic, DC, right up, right up up, up, left up up, left up, left left up and left.

For each block, the encoder selects one of the above prediction modes, and that prediction mode is used for predicting the quantized values of the pixels in the current block. The encoder chooses the prediction mode using the original values of the pixel values in the current block and the reconstructed pixel values for any previously reconstructed blocks. The encoder computes the prediction for each of the prediction modes. The computed predictions for each prediction mode are denoted. If the pixel values of all of the pixels in the current block are denoted, then for each denoted prediction mode, the encoder computes: SAD(predNum)=the sum of abs(Pred(PredNum)>>(depth-predSelDepth)-B>>(depth-predSelDepth)) for all pixels in the current block. Here, B includes the pixel values of the pixels in the current block, and predSelDepth is an input parameter to the encoder. This yields a SAD value for each prediction mode. The encoder selects the prediction mode with the smallest SAD value. If more than one prediction mode yields the smallest SAD value (e.g. if there is a tie), then any tie breaking rule is able to be used, including that of choosing the prediction mode which is closer to the beginning of the predNumList, where predNumList is a list of the prediction modes allowed at the encoder. The selected prediction mode, denoted by 'predNumBest,' and the corresponding prediction, denoted by 'Pred(predNumBest),' are then used in the rest of the process for encoding the block. The encoder then uses Pred(predNumBest) for the next stage of the encoding. In a DPCM-based method, predNumBest is signaled to the decoder using one or more bits in the bitstream.

Quantization in DPCM-Based Method

The next stage of coding is quantization with a quantization factor $qf=2^{qn}$ where qn is referred to as the quantization number. The encoder applies the quantization with the quantization number, qn, for each and every qn value listed in qnList. Then, for each qn value, the encoder applies all of the stages that follow quantization. For quantization, the encoder uniformly quantizes all of the pixels in B and all of the values in Pred(predNumBest). Quantization of a value x by quantization number qn is the computation of x>>qn. If x has a bit depth of 'depth,' then the quantized x has a bit depth of qDepth=depth-qn.

DPCM Computation

Then, for all pixels in the current block, the encoder computes the difference between the quantized original value and the quantized prediction value:

$$Resq=(B>>qn)-(Pred(predNumBest)>>qn)$$

This is referred to as the DPCM stage. The differences Resq are referred to as residuals of the quantized values for B. Resq is able to be negative, zero or positive.

Entropy Coding and Coding Accuracy

Resq is given as an input to the entropy encoder. The entropy encoder generates a variable length code (VLC) for each residual of the quantized value. A VLC is a sequence of bits where the number of bits generated, and the bits themselves, depend on the value of the residual of the quantized value. For any two residuals of the quantized values a and b, if abs(a)>abs(b), then the length of the VLC generated for a is larger than or equal to the length of the VLC generated for b. The decoder is able to use the VLC code generated by the entropy coder to reconstruct Resq values losslessly. The decoder is also able to reconstruct (Pred(predNumBest)>>qn) losslessly. Having both Resq and (Pred(predNumBest)>>qn), the decoder then is able to reconstruct B>>qn losslessly. This means that the qDepth most significant bits of the pixels in B are able to be encoded and decoded losslessly. At the encoder, the DPCM stage encodes the original pixel values with an "accuracy" of qDepth bits.

Refinement in DPCM-Based Method

For each qn value in qnList, the operation mentioned earlier is performed for all the pixels in a block, and then the total number of bits generated for the whole block is measured. Then, there are three possibilities that are able to occur.

1. The number of bits generated for the whole block is greater than the bit budget allocated for the current block, or the number of bits generated for at least one of the pixels in the block is greater than codeLengthLimit: then DPCM with the current value of qn is not allowed.

2. The number of bits generated for the whole block is the same as the bit budget for the current block: then DPCM with the current value of qn is allowed.

3. The number of bits generated for the whole block is less than the bit budget allocated for the current block: then DPCM with the current value of qn is allowed. However, more bits will then be generated in a process called "refinement." The refinement stage is able to use up the remaining allowed bits. If all of the remaining bits are not used, then the rest of the allowed bits are filled with zeros which are referred to as "zero pads."

The refinement stage increases the coding accuracy of the pixels in the original block. Each bit of data that is generated by the refinement stage will increase the coding accuracy of a pixel by one bit.

Pulse Code Modulation (PCM) Method

In addition to the DPCM-based method, the encoder also attempts a different type of method, referred to as the PCM method. In the PCM method, each pixel value is shifted to the right by a fixed number of bits. This fixed number of bits is constant for each pixel, but is able to be different from one pixel to another in a block. The shifted pixel values are then put in the bitstream without any further processing.

Accuracy, Mode Selection and Bitstream Generation

After the encoder applies the DPCM-based method using different qn values, and the PCM method, the encoder measures the coding accuracy for all the tested scenarios. For the DPCM-based method, for an image block, the 'accuracy' or the 'coverage' is defined as the total number of original pixel bits in the block that are coded with DPCM/VLC or by refinement. For the PCM method, for an image block, the 'accuracy' or the 'coverage' is defined as the total number of original pixel bits in the blocks that are coded. If DPCM with any of the qn values is allowed and the best coding accuracy is obtained by a DPCM-based method, the encoder sends a '1' signaling DPCM-based method, one or more bits that signal the best qn value, one or more bits that signal the predNumBest, bits generated by the entropy coding stage of all the pixels in the block, refinement bits (if any) and zero pads (if any). If DPCM with none of the qn values are allowed, or if DPCM with one or more qn values are allowed but the best coding accuracy is obtained by the PCM method, the encoder sends a '0' signaling the PCM method followed by the bits generated by the PCM method.

Reconstruction: DPCM Case

In the DPCM-based method, after encoding a block for each pixel in the block, qDepth=depth−qn bits are coded using DPCM/VLC. Between 0 to qn bits are coded using refinement, and for each pixel, the number of bits that are coded using refinement is denoted by f. The notation e=qn−f is used, where e is the 'effective qn' for a pixel. For a given pixel, depth−e bits are coded either by DPCM/VLC or by refinement, and e bits are not coded at all. For the purpose of reconstruction (at the encoder and decoder), the most significant depth−e bits are set to the values encoded by the encoder, the most significant uncoded bit is set to '1' and the other uncoded bits are set to '0.'

Reconstruction: PCM Case

In the PCM method, after encoding a block, for each pixel in the block, qDepth=depth−qnPCM bits are coded using the PCM method, and qnPCM bits are not coded at all. For the purpose of reconstruction (at the encoder and decoder), the most significant depth−qnPCM bits are set to the values encoded by the encoder. The most significant uncoded bit is set to '1,' and the other uncoded bits are set to '0.'

Prediction

For each block, a number of prediction modes is able to be defined. Some of the prediction modes are able to be associated with possible edge directions in an image. For example, FIG. 1 shows 7 possible prediction modes associated with different possible directions in an image. Some other prediction modes are able to be defined that are not associated with possible edge directions in an image. For example, two prediction modes are 'generic' and 'DC.' Using the additional two example cases, there are nine prediction modes.

Prediction for the First Line

For the prediction, for most of the prediction modes, the encoder and decoder need reconstructed values of the previous line. However, for the first line, there is no previous line to use for prediction. In this case, the needed reconstructed values from the previous line that are not available are assumed to be: $2^{(depth-1)}$. For depth=10, this yields 512.

Restriction on Prediction Patterns

To obtain a prediction for a pixel A in the current block, the prediction is obtained by one of the two prediction possibilities. The first is using one or more reconstructed values from previously encoded blocks, which are able to be combined in any desired method. The second is using exactly one of the original pixel values in the current block that is located before the current pixel.

Signaling qn and Prediction Mode in the Bitstream

If the qn for the current block is the same as the qn of the block on the top, a '1' is sent. For the first line in the image, the qn of the top block is assumed to be the first qn in qnList. If the top block is coded using the PCM method (and hence has no qn associated with it), the qn of the top of the top is used instead of the qn of the top. If the qn used for the current block is different from the qn of the block on the top, a '0' is sent, followed by the binary representation of I−1 where I is the index of the qn in qnList when the qn of the top block is removed from the list. For example, if qnList=[0 1 2 3 4 5 6 7], and the qn of the top block is 3, then the following table shows the signaling bits used the eight possible qn values for the current block:

|  | qn of the current block | | | | | | |
| --- | --- | --- | --- | --- | --- | --- | --- |
|  | 0 | 1 | 2 | 3 | 4 | 5 | 6 |
| The signal for specifying the qn of the current block | 0000 | 0001 | 0010 | 1 | 0011 | 0100 | 0110 |

Signaling the prediction mode is done in the same manner.

Entropy Encoding

For any residual of the quantized value, the entropy coder computes the VLC.

1. The total number of bits used for representing the magnitude of the residual of the quantized value are counted (ignoring 0's on the left of the most significant '1'), which gives the value K for the residual of the quantized value.

2. K zeros are written into the bitstream.

3. The K magnitude bits are written.

Figure 2:
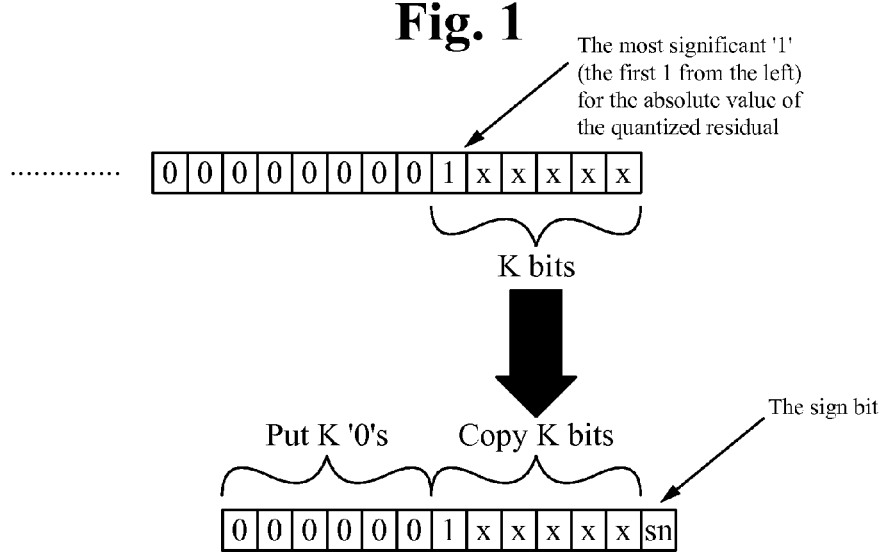
FIG. 2 illustrates an exemplary VLC computation according to some embodiments.

4. Then, the sign bit is written, 0 for negative and 1 for zero or positive. FIG. 2 illustrates an exemplary VLC computation according to some embodiments.

FIG. 3 illustrates an exemplary entropy coding table according to some embodiments. As shown in the table, the leftmost column is a residual of the quantized value input. The middle columns are the binary representation of the input, the magnitude and the sign bit where the sign bit is 0 for negative and 1 for positive. The output includes the K zeros before K magnitude bits and a sign bit at the end.

Refinement at the Encoder

Figure 4:
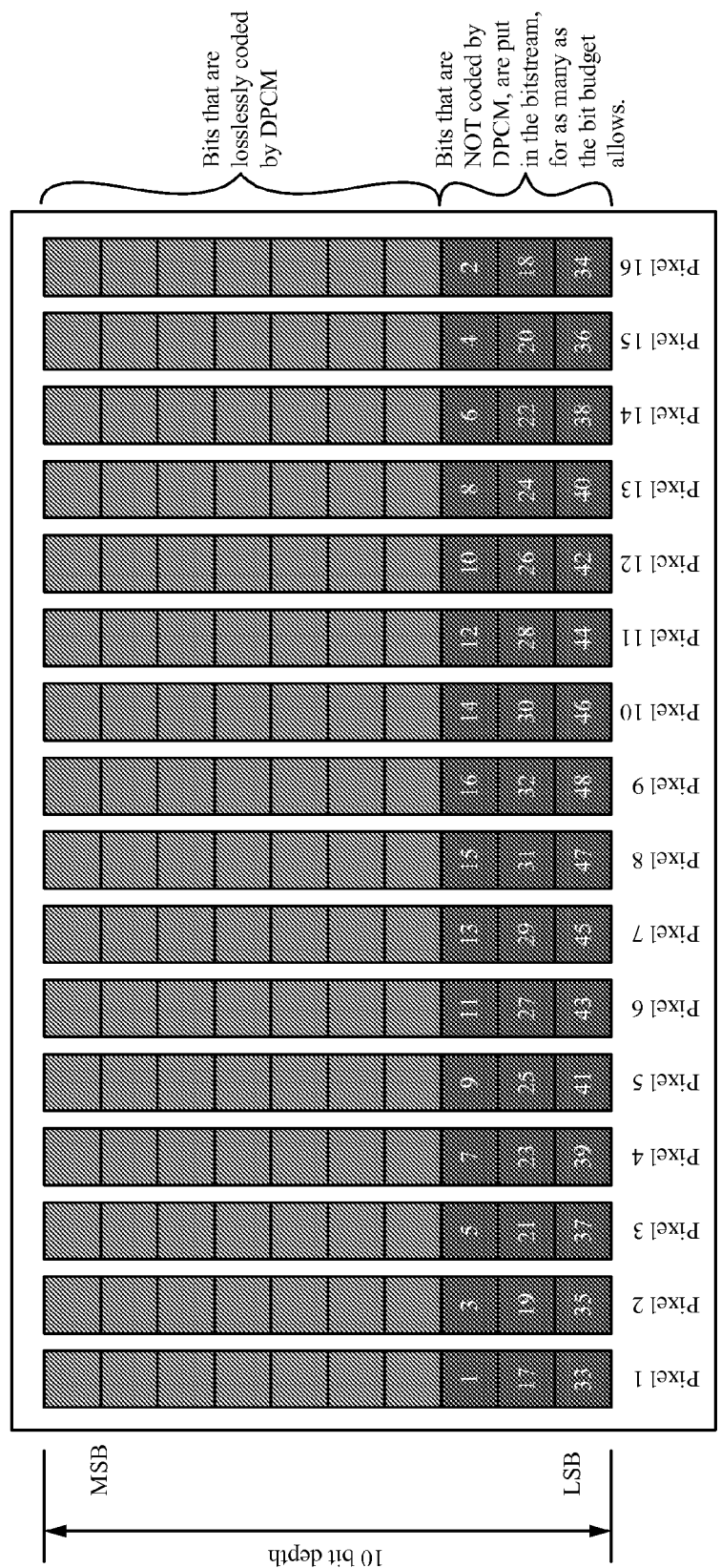
FIG. 4 illustrates an example of using remaining bits for refinement according to some embodiments.

After DPCM coding and entropy coding, a series of bits are generated at the encoder for signaling a PCM/DPCM bit, signaling the qn value of the block, signaling prediction mode and the bits generated by the entropy coder. The number of these bits are able to be less than the block bit budget. To use the remaining bits, the encoder sends the bits of original pixels, starting from the most significant bits that are not DPCM coded as alternating between left and right of the block. FIG. 4 illustrates an example of using remaining bits for refinement. The blockWidth equals 16 and the qn is 3. The order of sending refinement bits is shown. In this example, as many bits as the bit budget allows (up to 48 bits) are able to be sent as refinement bits. The refinement bits are transmitted during the refinement stage.

DPCM-Based Coding, Reconstruction Values

Figure 5:
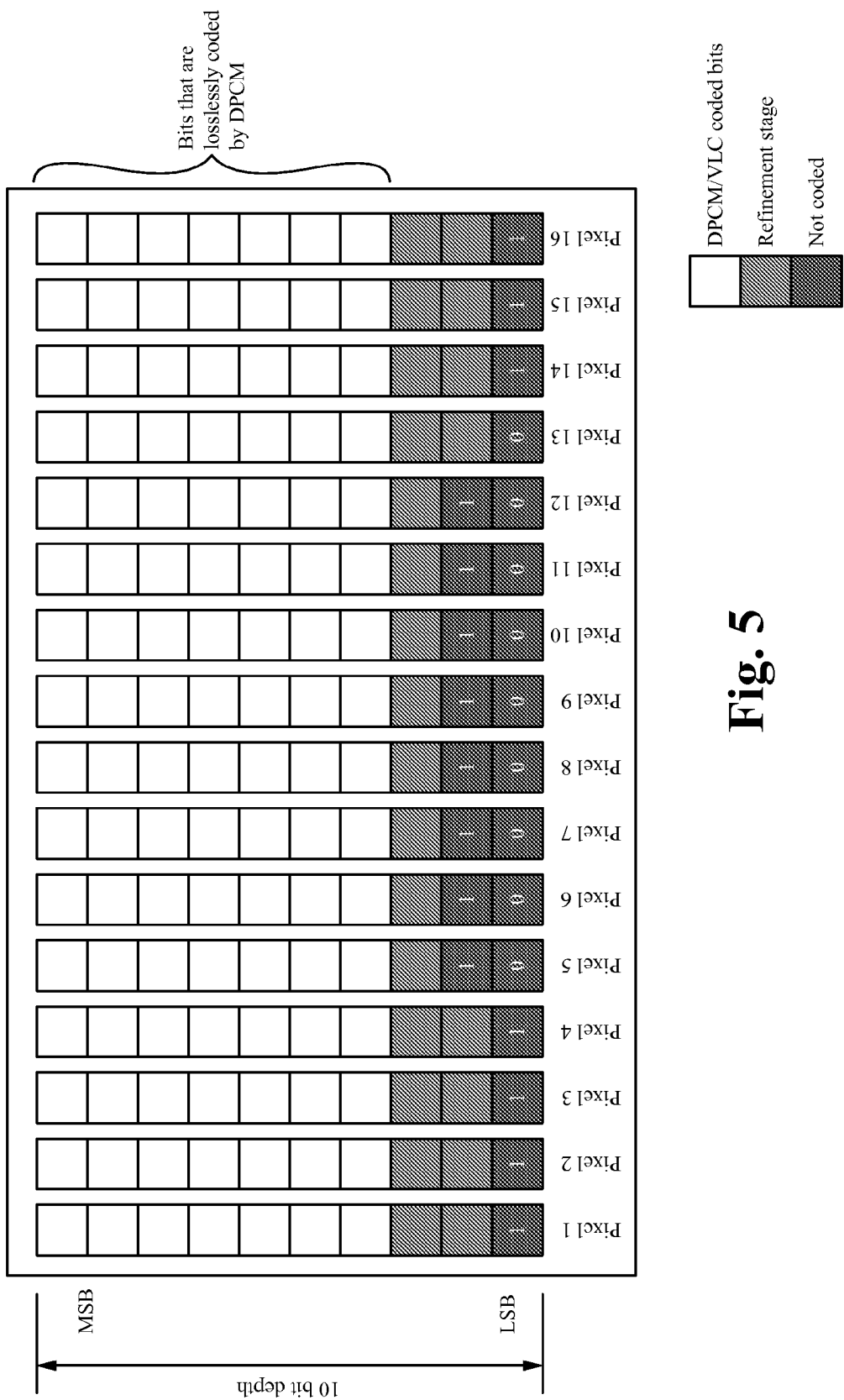
FIG. 5 illustrates an example of DPCM-based coding and reconstruction values according to some embodiments.

FIG. 5 illustrates an example of DPCM-based coding and reconstruction values. The numbers shown indicate the values assigned to the uncoded bits during the reconstruction at the encoder and decoder.

How Accuracy is Measured for Mode Decision

Referring back to FIG. 5, there are depth×blockWidth bits in the original binary representation of the block pixels. The DPCM encodes (depth−qn)×blockWidth bits of the above bits losslessly. The (depth−qn)×blockWidth bits are referred to as the bits covered by DPCM. The refinement stage also covers extra bits, represented by R. The R bits are covered by refinement. Thus, out of depth×blockWidth bits of the original signal, a total of (depth−qn)×blockWidth+R bits are covered and the remaining blocks are not. The total number of bits covered are used as the measure of accuracy of the coding for each DPCM-based method with a given qn.

Figure 6:
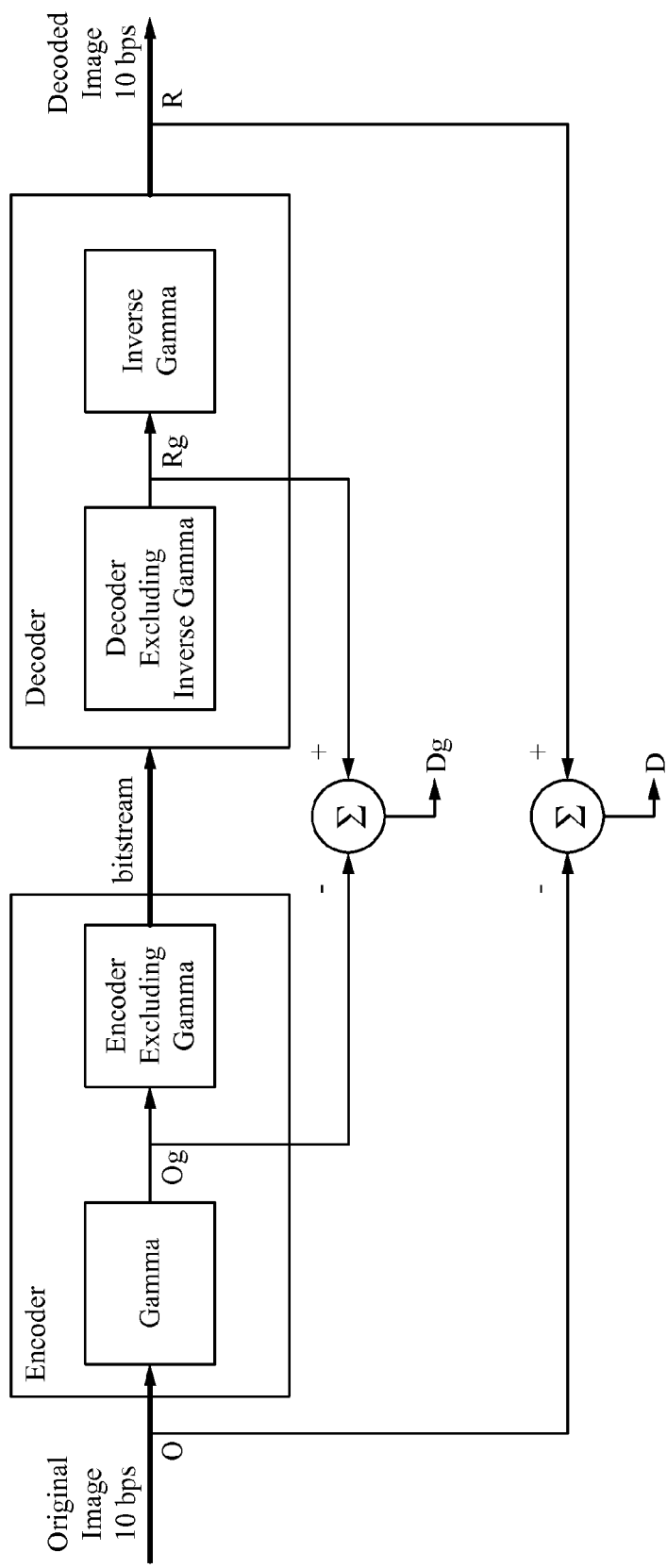
FIG. 6 illustrates an encoder and decoder according to some embodiments.

Distribution of the Pixel Value Differences Between the Original and the Reconstructed Images The image obtained by computing the difference between the reconstructed image and the original image is denoted by D. FIG. 6 illustrates an encoder and decoder according to some embodiments.

For each pixel in an image, an effective qn for that pixel, denoted by e, is the number of bits in the original pixel value that are not encoded during the encoding process. If the pixel is in a block that is PCM coded, e is the number of pixel bits that are not coded by the encoder. If the pixel is in a block that is DPCM coded, e is the number of bits in the original pixel value that are not coded by either DPCM or refinement. The encoder (excluding Gamma), in effect, uniformly quantizes every pixel in the original image after gamma (Og) with the step size $s=2^e$, where e (and therefore s) are able to be different from one pixel to another.

When a pixel is to be uniformly quantized with a step size of s, two concepts are defined for the quantization. The quantization bin is the group of s values that are all quantized to the same value. The reconstruction value for that bin is the value that will represent all of the members of the bin at the reconstruction. A uniform distribution is assumed for the pixel values in Og. The quantization bins are of equal size and for each quantization bin, and the reconstruction value is at the middle of the bin. Since the range of pixel values is a power of 2, the number of values in each quantization bin (which is s) is also a power of 2 (e.g. $s=2^e$). Therefore, either s=1, which is the case of e=0, meaning lossless quantization. In this case, there is only one value in each bin, and the value is both the original value and the reconstructed value. Or, s is even, in which case, none of the original samples is exactly at the middle of the bin. The middle of the bin is right between two sample values. To choose a reconstruction value, either the sample value just above or just below the middle point is chosen.

Figure 7:
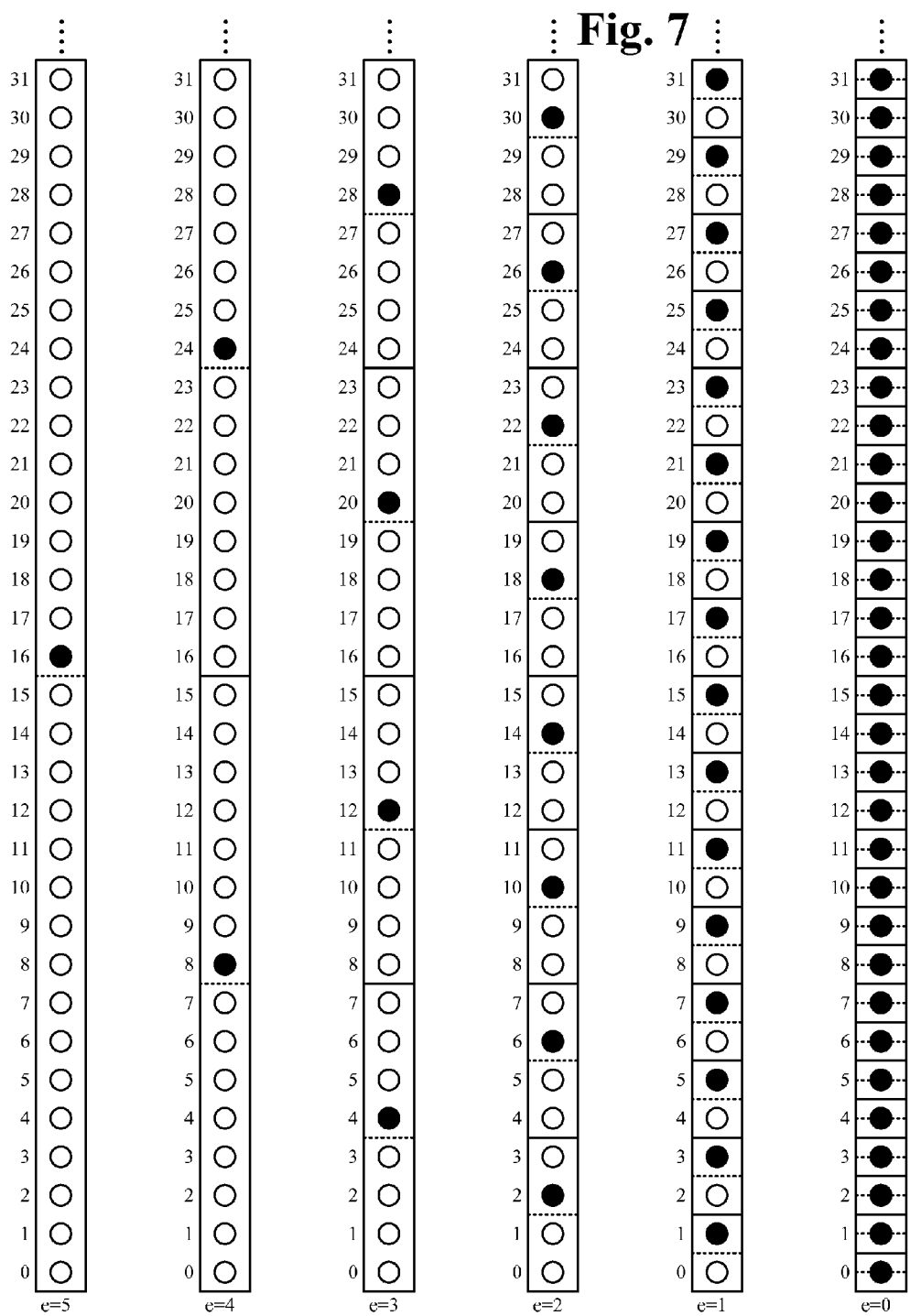
FIG. 7 illustrates bins and their reconstruction values for the cases of e=0, 1, 2, 3, 4 and 5 according to some embodiments.

FIG. 7 illustrates the bins and their reconstruction values for the cases of e=0, 1, 2, 3, 4 and 5. In FIG. 7, both the circles and black disks represent the original values, the boxes represent the bins, the black disks represent the reconstructed value in each bin and the dashed line segments represent the middle point of each bin.

The Effect on Bias

Assuming a uniform distribution of the original pixel values over the range of 0 to 1023, if a reconstruction value right above the middle point is chosen, then a bias of +0.5 is yielded to the reconstructed image. Similarly, the bias would be −0.5 if the reconstruction value is chosen to be right below the middle point. There are different ways to avoid the bias. One way is to alternate between the 'right above' and 'right below' sample values.

Role of Gamma

In the Gamma function and the inverse Gamma function, there are certain divisions by 2 and 4 applied to certain pixels. The divisions are performed using shift left operations. The shift left once operation yields a bias of −0.5 for the pixels to which it is applied. The shift left twice operation yields a bias of −1.5 for those pixels to which it is applied. Another role of Gamma is that it changes the histogram of the original input image. After Gamma, in Og, certain values do not occur any more. Therefore, the distribution of the pixel values in Og is no longer uniform.

DPCM Structure

Figure 8:
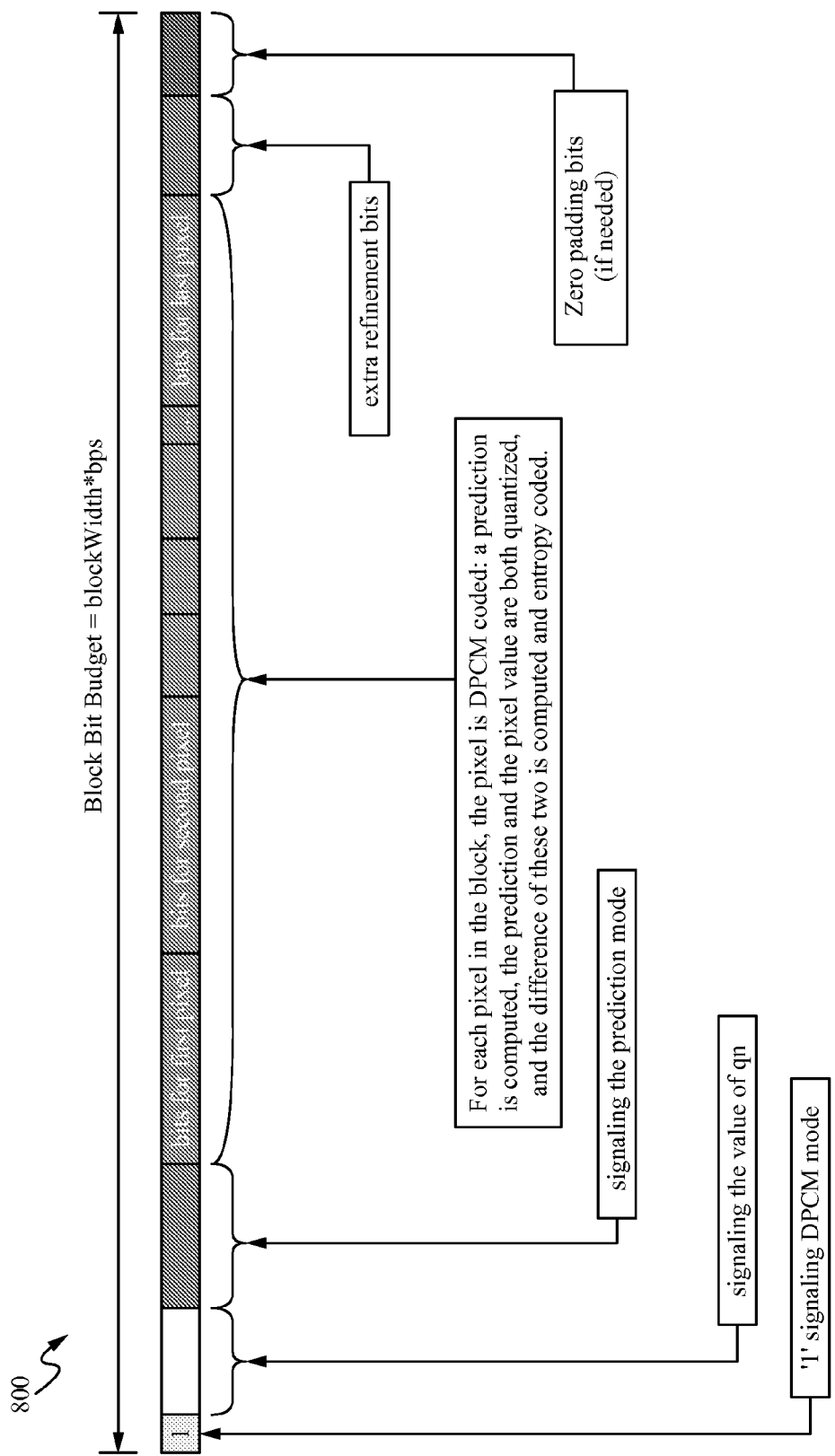
FIG. 8 illustrates a bitstream structure for the DPCM modes according to some embodiments.

FIG. 8 illustrates a bitstream structure 800 for the DPCM modes according to some embodiments. The bitstream structure 800 has a length of blockBitBudget. A first bit (also referred to as a most significant bit) is a '1' to indicate DPCM mode. Then, bits are used to indicate the value of qn. Following are bits signaling the prediction mode. For each pixel in the block, the pixel is DPCM coded: the pixel and its prediction are quantized with qn, and their difference is entropy coded. Each pixel generates 1 to codeLengthLimit bits depending on the residual of the quantized value and the qn value. If the total number of bits at this point are less than the block bit budget, extra refinement bits are added to further improve the accuracy of coding. Finally, zero padding bits are appended at the end if the block is coded losslessly.

PCM

Figure 9:
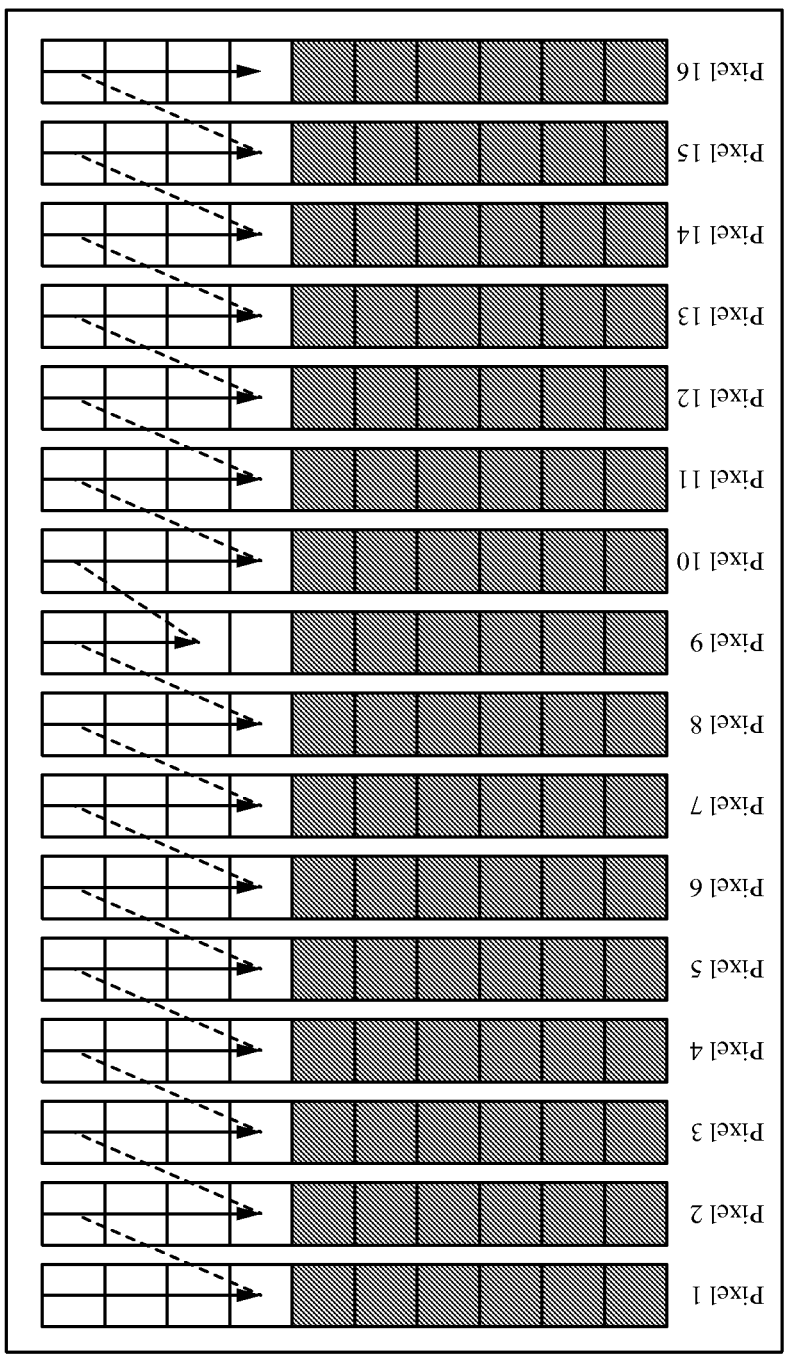
FIG. 9 illustrates the order of transmission of bits for the PCM method, for the case of a block width equal to 16 and a bps of 4 according to some embodiments.
Figure 10:
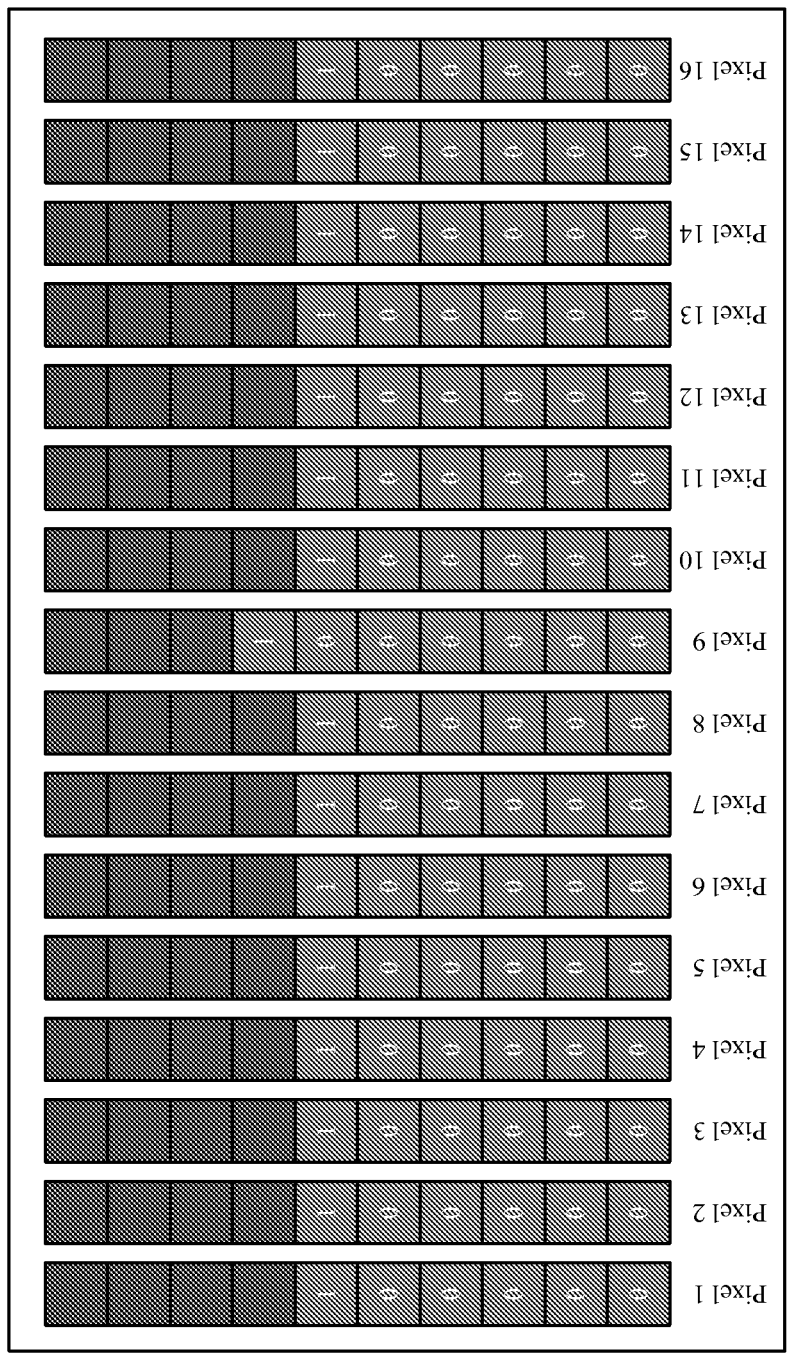
FIG. 10 illustrates reconstruction of the block, for the PCM method, according to some embodiments.

FIG. 9 illustrates the order of transmission of bits for the PCM method, for the case of a block width equal to 16 and a bps of 4. FIG. 10 illustrates reconstruction of the block.

Figure 11:
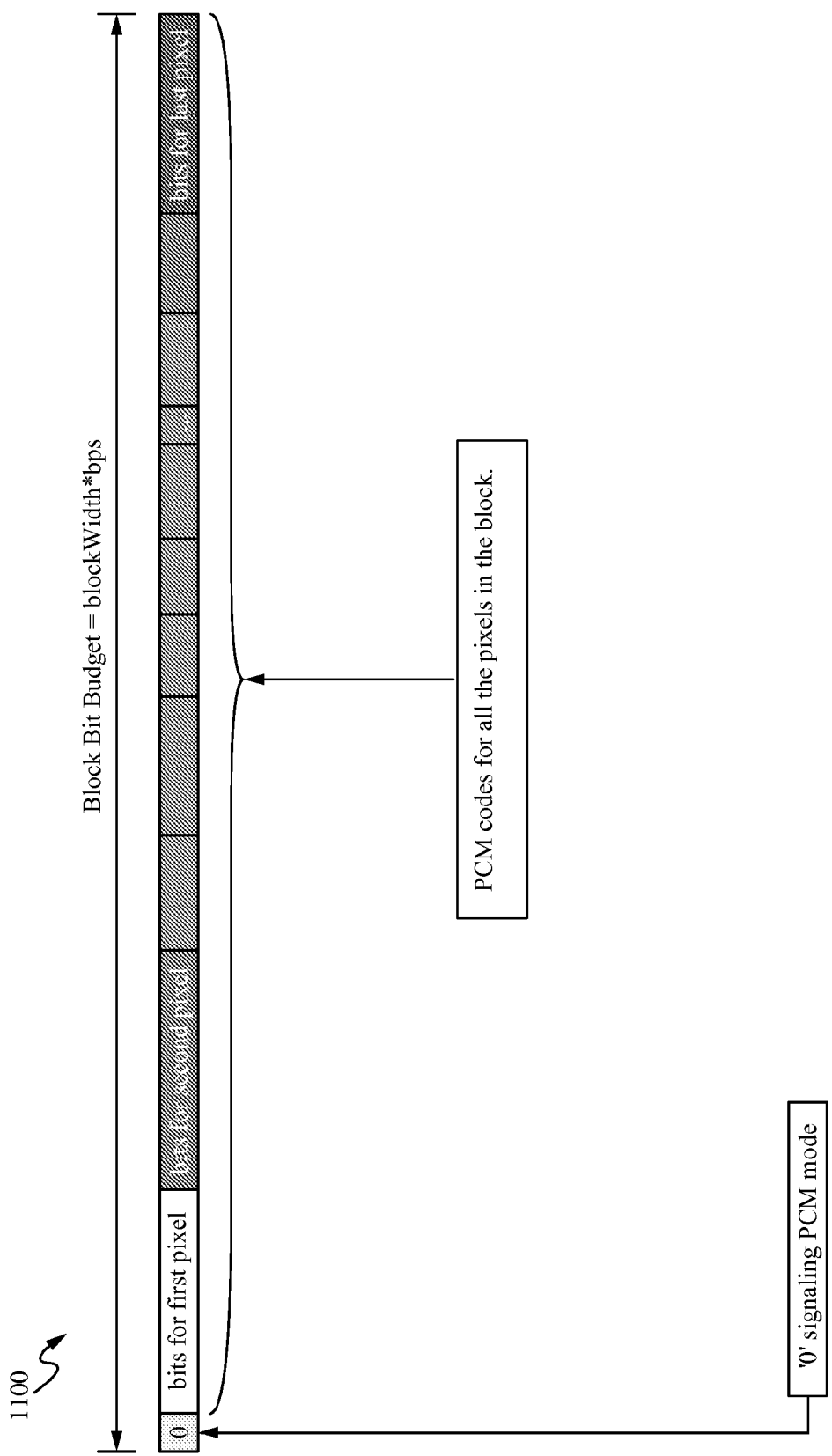
FIG. 11 illustrates a bitstream structure for the PCM mode according to some embodiments.

FIG. 11 illustrates a bitstream structure 1100 for the PCM mode according to some embodiments. The bitstream structure 1100 has a length of blockBitBudget. A first bit (also referred to as a most significant bit) is a '0' to indicate PCM mode. Then, for the remaining pixels, PCM codes for all of the pixels in the block are included.

Encoder

Figure 12:
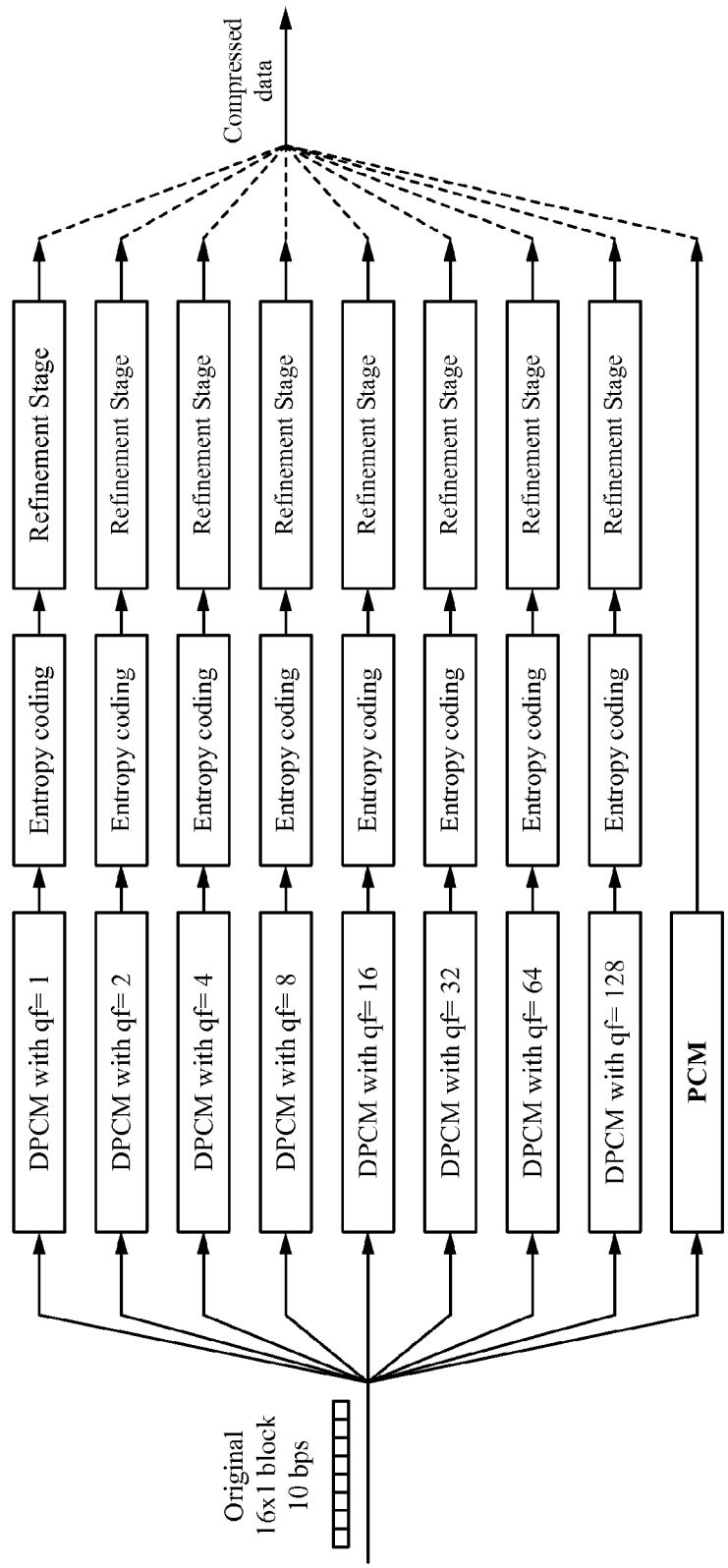
FIG. 12 illustrates an encoder structure with multiple refinement stages according to some embodiments.
Figure 13:
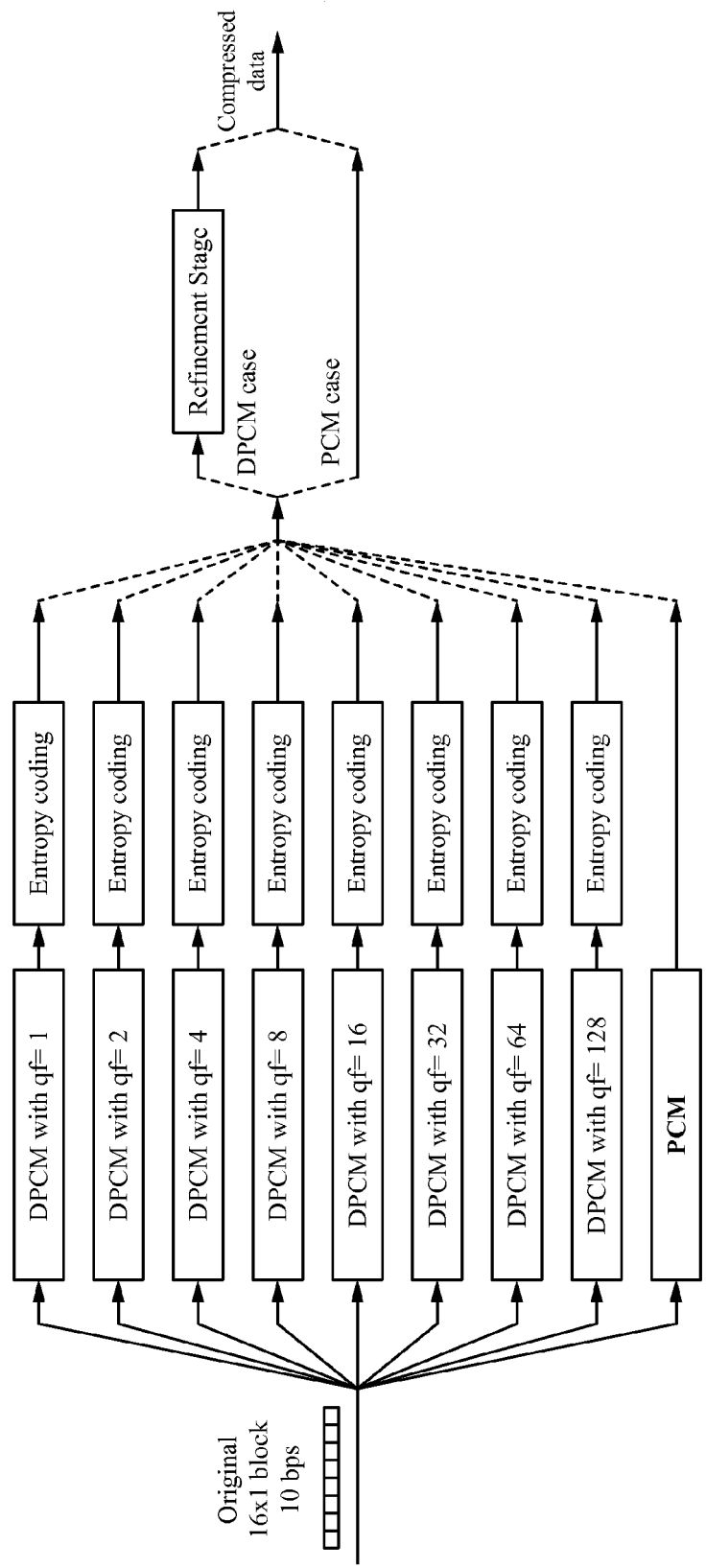
FIG. 13 illustrates an encoder structure with a single refinement stage according to some embodiments.
Figure 14:
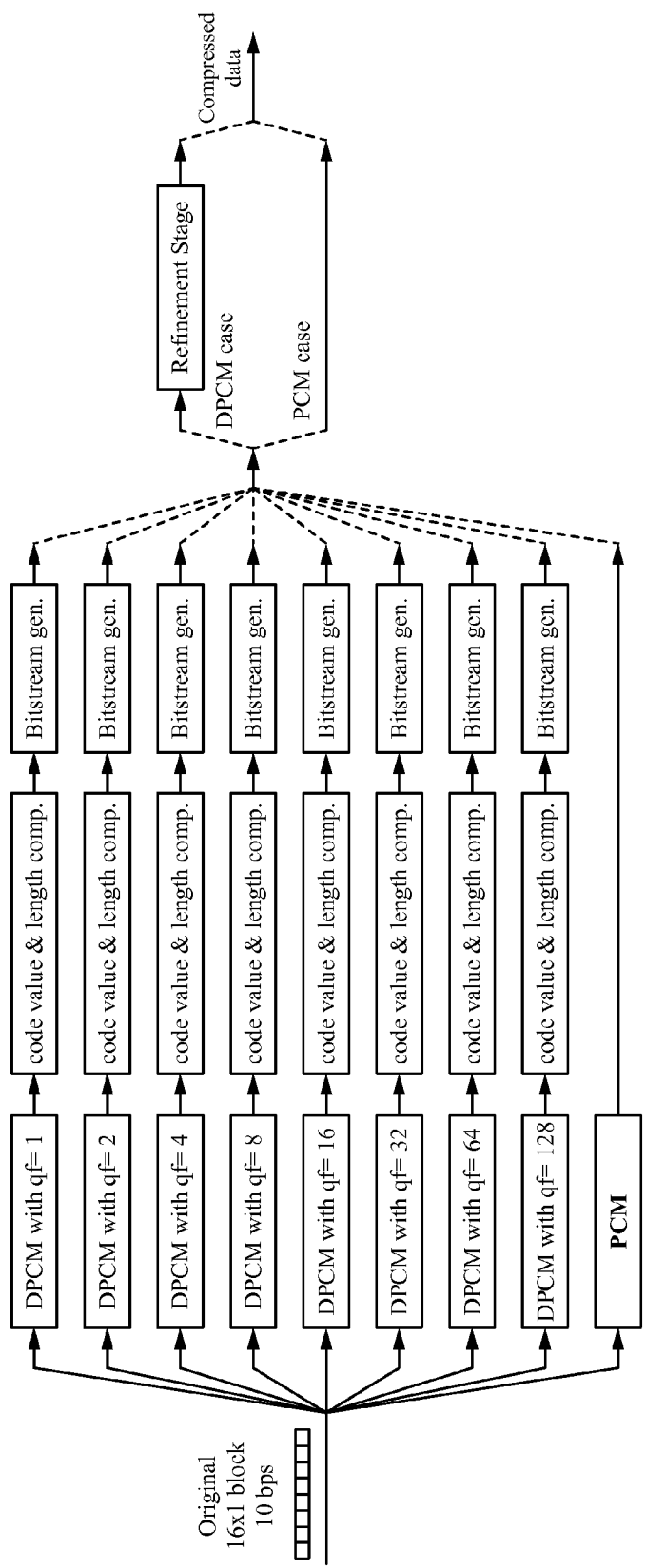
FIG. 14 illustrates an encoder with entropy coding separated into two parts: code value/length computation and bitstream generation according to some embodiments.
Figure 15:
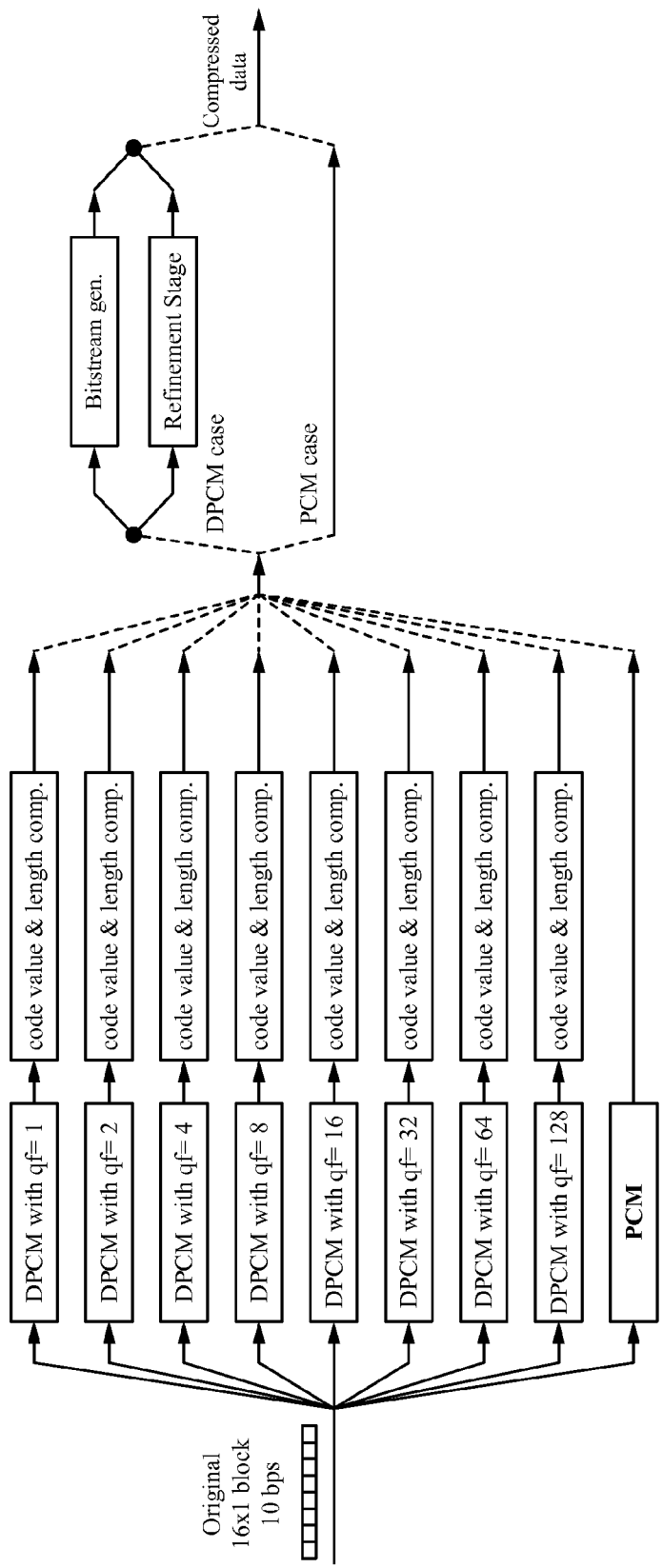
FIG. 15 illustrates an encoder with code value and length computation separate from the bitstream generation but a single refinement stage and a single bitstream generation according to some embodiments.

An exemplary encoder structure is shown in FIG. 12 with multiple refinement stages. The example in FIG. 12 includes a refinement stage for each of the modes. FIG. 13 illustrates an encoder structure with a single refinement stage. Thus, instead of a refinement stage for each of the modes, there is a single refinement stage. FIG. 14 illustrates an encoder with entropy coding separated into two parts: code value/length computation and bitstream generation. FIG. 15 illustrates an encoder with code value and length computation separate from the bitstream generation but a single refinement stage and a single bitstream generation. The examples are only meant to illustrate some of the possible examples. Other implementations are possible including fewer or more components.

Figure 16:
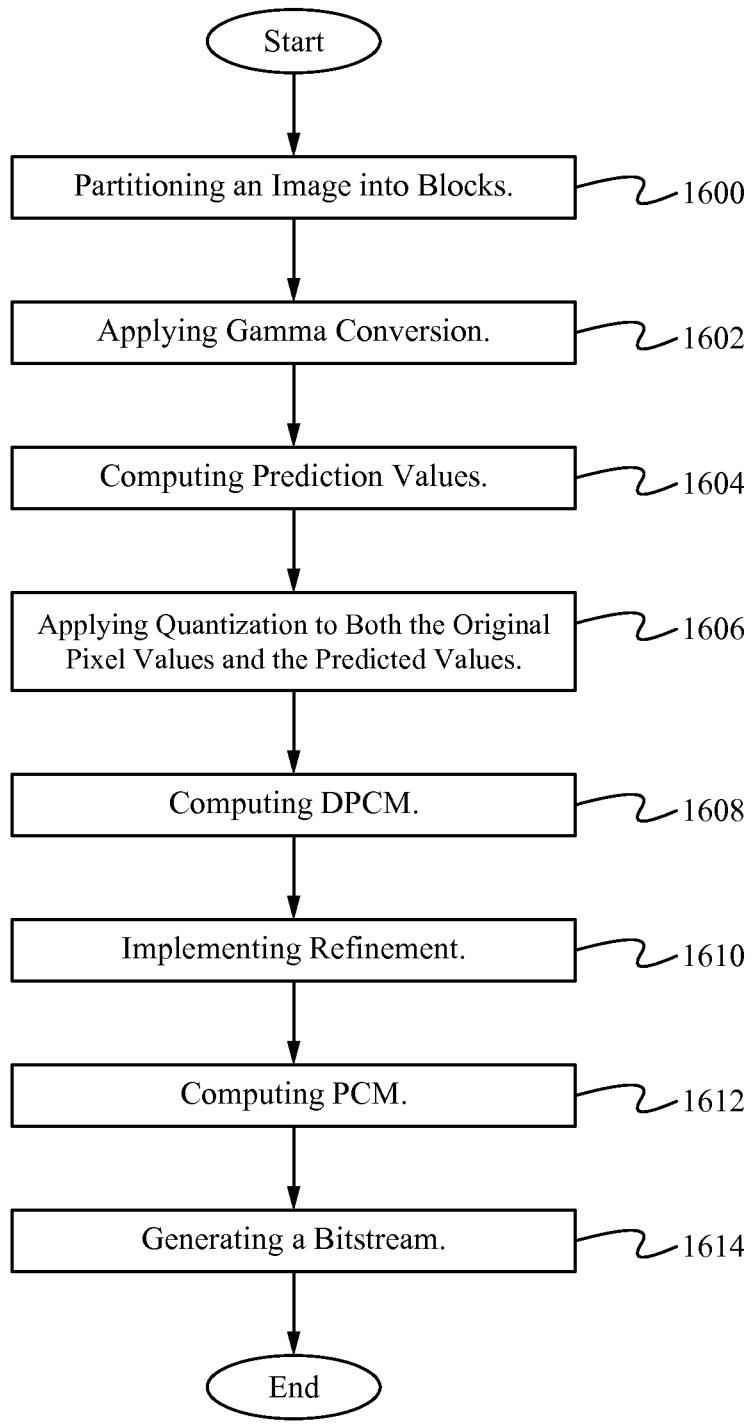
FIG. 16 illustrates a flowchart of a method of compression using a fixed number of bits per block according to some embodiments.

FIG. 16 illustrates a flowchart of a method of compression using a fixed number of bits per block according to some embodiments. In the step 1600, the image is partitioned into blocks. In some embodiments, the image is first partitioned into vertical stripes and then each vertical stripe is partitioned into small line segments referred to as blocks. In the step 1602, gamma conversion is applied to generate data such as 10-bit data. In the step 1604, prediction values are computed. As described herein, there are many possible prediction methods. In the step 1606, quantization is applied to the pixels. In the step 1608, DPCM computation occurs. In the step 1608, the difference between the quantized pixel and the quantized prediction is computed, and entropy coding is implemented to generate a variable length code for each residual of the quantized value. In the step 1610, refinement is implemented. In the step 1612, PCM computation occurs. In the step 1614, a bitstream is generated. The bitstream depends on which of DPCM and PCM method results in higher accuracy. The order of the steps is able to be changed and in some embodiments, some steps are able to be skipped.

Figure 17:
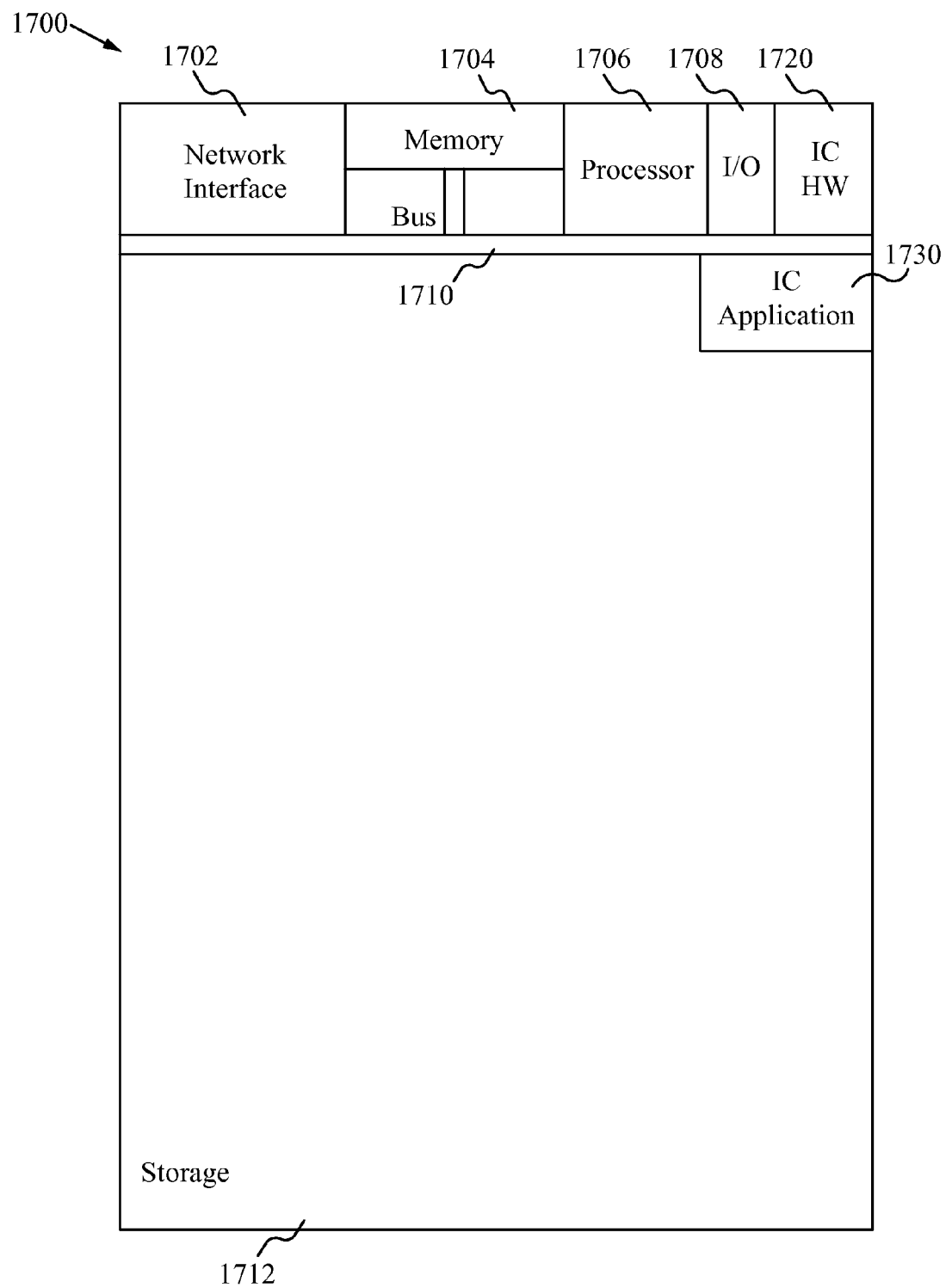
FIG. 17 illustrates a block diagram of an exemplary computing device configured to implement the image compression using a fixed number of bits per block method according to some embodiments.

FIG. 17 illustrates a block diagram of an exemplary computing device 1700 configured to implement the image compression using a fixed number of bits per block method according to some embodiments. The computing device 1700 is able to be used to acquire, store, compute, communicate and/or display information such as images and videos. For example, a computing device 1700 is able to acquire and store an image. The image compression method is able to be used when acquiring or viewing an image on the device 1700. In general, a hardware structure suitable for implementing the computing device 1700 includes a network interface 1702, a memory 1704, a processor 1706, I/O device(s) 1708, a bus 1710 and a storage device 1712. The choice of processor is not critical as long as a suitable processor with sufficient speed is chosen. The memory 1704 is able to be any conventional computer memory known in the art. The storage device 1712 is able to include a hard drive, CDROM, CDRW, DVD, DVDRW, flash memory card or any other storage device. The computing device 1700 is able to include one or more network interfaces 1702. An example of a network interface includes a network card connected to an Ethernet or other type of LAN. The I/O device(s) 1708 are able to include one or more of the following: keyboard, mouse, monitor, display, printer, modem, touchscreen, button interface and other devices. Image compression application(s) 1730 used to perform the image compression method are likely to be stored in the storage device 1712 and memory 1704 and processed as applications are typically processed. More or less components shown in FIG. 17 are able to be included in the computing device 1700. In some embodiments, image compression hardware 1720 is included. Although the computing device 1700 in FIG. 17 includes applications 1730 and hardware 1720 for image compression, the image compression method is able to be implemented on a computing device in hardware, firmware, software or any combination thereof. For example, in some embodiments, the image compression applications 1730 are programmed in a memory and executed using a processor. In another example, in some embodiments, the image compression hardware 1720 is programmed hardware logic including gates specifically designed to implement the image compression method.

In some embodiments, the image compression application(s) 1730 include several applications and/or modules. As described herein, the modules include a partitioning module, an encoding module, a gamma module, a prediction module, a quantization module, a DPCM module, a refinement module, a PCM module and a bitstream module, each for implementing the respective methods described herein. In some embodiments, a separate DPCM encoding module exists for each quantization factor. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a television, a home entertainment system or any other suitable computing device.

To utilize the image compression method, a user acquires a video/image such as on a digital camcorder, and while or after the video is acquired, the image compression method automatically compresses each image of the video, so that the video is compressed appropriately to maintain a high quality video. The image compression method occurs automatically without user involvement. Similarly, when a decoder is decoding the video, the decoder automatically decodes the video so that it displays appropriately.

In operation, the image compression method described herein provides image compression with a low hardware cost (e.g. not many logic gates are needed) in some embodiments, low complexity, low delay, very high visual quality (e.g. visually lossless) and does not depend on other blocks for decoding (e.g. decode any block since fixed block size). The image compression method is able to be used in any implementation including, but not limited to, wireless high definition (Wireless HD).

The image compression method described herein is able to be used with videos and/or image.

Some Embodiments of a Method of Compression of Digital Images Using a Fixed Number of Bits Per Block 1. A method of image compression programmed in a controller in a device comprising:
   a. partitioning an image into one or more blocks; and
   b. encoding the one or more blocks, wherein a number of bits in each of the one or more blocks is fixed.
2. The method of clause 1 further comprising applying gamma conversion to generate 10-bit data.
3. The method of clause 1 further comprising computing prediction values for each pixel in a current block of the one or more blocks using one or more prediction modes.

4. The method of clause 3 wherein the prediction modes include at least one of:
   a. generic;
   b. DC;
   c. right up;
   d. right up up;
   e. up;
   f. left up up;
   g. left up;
   h. left left up; and
   i. left.
5. The method of clause 1 further comprising applying quantization.
6. The method of clause 1 further comprising computing Differential Pulse Code Modulation to generate residuals of the quantized values.
7. The method of clause 6 further comprising implementing entropy coding to generate a variable length code for each residual of the quantized value.
8. The method of clause 7 wherein implementing entropy coding is separated into two parts: code value/length computation and bitstream generation.
9. The method of clause 7 wherein implementing entropy coding is separated into two parts: code value/length computation and bitstream generation but with a single refinement stage and a single bitstream generation.
10. The method of clause 1 further comprising implementing refinement.
11. The method of clause 10 wherein implementing refinement includes a separate refinement stage for each quantization.
12. The method of clause 10 wherein implementing refinement includes a single refinement stage.
13. The method of clause 1 further comprising computing Pulse Code Modulation including shifting each pixel value a fixed number of bits.
14. The method of clause 1 further comprising generating a bitstream.
15. The method of clause 14 wherein generating the bitstream includes selecting a coding method of Differential Pulse Code Modulation or Pulse Code Modulation.
16. The method of clause 1 wherein the controller is selected from the group consisting of a programmed computer readable medium and an application-specific circuit.
17. The method of clause 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television and a home entertainment system.
18. A system for image compression programmed in a controller in a device comprising:
   a. a partitioning module for partitioning an image into one or more blocks; and
   b. an encoding module for encoding the one or more blocks, wherein a number of bits in each of the one or more blocks is fixed.
19. The system of clause 18 further comprising a computing module for computing prediction values for each pixel in a current block of the one or more blocks using one or more prediction modes.
20. The system of clause 19 wherein the prediction modes include at least one of:
   a. generic;
   b. DC;
   c. right up;
   d. right up up;
   e. up;
   f. left up up;
   g. left up;
   h. left left up; and
   i. left.
21. A system for image compression programmed in a controller in a device comprising:
   a. gamma module for applying gamma conversion to generate 10-bit data;
   b. a prediction module for computing prediction values for each pixel in a current block of the one or more blocks using one or more prediction modes;
   c. a quantization module for applying quantization;
   d. a DPCM module for computing Differential Pulse Code Modulation to generate residuals of the quantized values;
   e. a refinement module for implementing refinement;
   f. a PCM module for computing Pulse Code Modulation including shifting each pixel value a fixed number of bits; and
   g. a bitstream module for generating a bitstream wherein generating the bitstream includes selecting a coding method of Differential Pulse Code Modulation or Pulse Code Modulation.
22. The system of clause 21 wherein the prediction modes include at least one of:
   a. generic;
   b. DC;
   c. right up;
   d. right up up;
   e. up;
   f. left up up;
   g. left up;
   h. left left up; and
   i. left.
23. The system of clause 21 wherein the controller is selected from the group consisting of a programmed computer readable medium and an application-specific circuit.
24. The system of clause 21 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television and a home entertainment system.
25. A camera device comprising:
   a. a video acquisition component for acquiring a video;
   b. a memory for storing an application, the application for:
      i. partitioning an image into one or more blocks; and
      ii. encoding the one or more blocks, wherein a number of bits in each of the one or more blocks is fixed; and
   c. a processing component coupled to the memory, the processing component configured for processing the application.
26. The camera device of clause 25 wherein the application is further for computing prediction values for each pixel in a current block of the one or more blocks using one or more prediction modes.
27. The camera device of clause 26 wherein the prediction modes include at least one of:
   a. generic;
   b. DC;
   c. right up;
   d. right up up;

e. up;
f. left up up;
g. left up;
h. left left up; and
i. left.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of image compression programmed in a controller in a device comprising:
   a. partitioning an image into one or more blocks;
   b. computing prediction values for each pixel in a current block of the one or more blocks using at least one or more prediction modes, wherein the one or more prediction modes are selectable from 9 modes; and
   c. encoding the one or more blocks using the prediction values, wherein a number of bits in each of the one or more blocks is fixed.

2. The method of claim 1 further comprising applying gamma conversion to generate 10-bit data.

3. The method of claim 1 wherein the prediction modes include at least one of:
   a. generic;
   b. DC;
   c. right up;
   d. right up up;
   e. up;
   f. left up up;
   g. left up;
   h. left left up; and
   i. left.

4. The method of claim 1 further comprising applying quantization.

5. The method of claim 1 further comprising computing Differential Pulse Code Modulation to generate residuals of the quantized values.

6. The method of claim 5 further comprising implementing entropy coding to generate a variable length code for each residual of the quantized value.

7. The method of claim 6 wherein implementing entropy coding is separated into two parts: code value/length computation and bitstream generation.

8. The method of claim 6 wherein implementing entropy coding is separated into two parts: code value/length computation and bitstream generation but with a single refinement stage and a single bitstream generation.

9. The method of claim 1 further comprising implementing refinement.

10. The method of claim 9 wherein implementing refinement includes a separate refinement stage for each quantization.

11. The method of claim 9 wherein implementing refinement includes a single refinement stage.

12. The method of claim 1 further comprising computing Pulse Code Modulation including shifting each pixel value a fixed number of bits.

13. The method of claim 1 further comprising generating a bitstream.

14. The method of claim 13 wherein generating the bitstream includes selecting a coding method of Differential Pulse Code Modulation or Pulse Code Modulation.

15. The method of claim 1 wherein the controller is selected from the group consisting of a programmed computer readable medium and an application-specific circuit.

16. The method of claim 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television and a home entertainment system.

17. A system for image compression programmed in a controller in a device comprising:
   a. a partitioning module for partitioning an image into one or more blocks;
   b. a computing module for computing prediction values for each pixel in a current block of the one or more blocks using one or more prediction modes, wherein the one or more prediction modes are selectable from 9 modes; and
   c. an encoding module for encoding the one or more blocks using the prediction values, wherein a number of bits in each of the one or more blocks is fixed.

18. The system of claim 17 wherein the prediction modes include at least one of:
   a. generic;
   b. DC;
   c. right up;
   d. right up up;
   e. up;
   f. left up up;
   g. left up;
   h. left left up; and
   i. left.

19. A camera device comprising:
   a. a video acquisition component for acquiring a video;
   b. a memory for storing an application, the application for:
      i. partitioning an image into one or more blocks;
      ii. computing prediction values for each pixel in a current block of the one or more blocks using at least one or more prediction modes, wherein the one or more prediction modes are selectable from 9 modes; and
      iii. encoding the one or more blocks using the prediction values, wherein a number of bits in each of the one or more blocks is fixed; and
   c. a processing component coupled to the memory, the processing component configured for processing the application.

20. The camera device of claim 19 wherein the prediction modes include at least one of:
   a. generic;
   b. DC;
   c. right up;
   d. right up up;
   e. up;
   f. left up up;
   g. left up;
   h. left left up; and
   i. left.

* * * * *